(12) United States Patent
Coldrey et al.

(10) Patent No.: US 8,594,158 B2
(45) Date of Patent: Nov. 26, 2013

(54) BASE AND REPEATER STATIONS (75) Inventors: Mikael Coldrey, Landvetter (SE);
Martin Nils Johansson, Molndal (SE);
Sven Oscar Petersson, Savedalen (SE)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 267 days.

(21) Appl. No.: 13/003,907

(22) PCT Filed: Jul. 16, 2008

(86) PCT No.: PCT/EP2008/059287
§ 371 (c)(1),
(2), (4) Date: Jan. 13, 2011

(87) PCT Pub. No.: WO2010/006645
PCT Pub. Date: Jan. 21, 2010

(65) Prior Publication Data
US 2011/0142104 A1 Jun. 16, 2011

(51) Int. Cl.
*H04B 3/36* (2006.01)

(52) U.S. Cl.
USPC .......................... 375/211; 375/214; 379/338

(58) Field of Classification Search
USPC ........................................................ 375/211
See application file for complete search history.

(56) References Cited

U.S. PATENT DOCUMENTS

| 8,032,080 | B2 * | 10/2011 | Andersson et al. | 455/11.1 |
| 8,059,727 | B2 * | 11/2011 | Proctor et al. | 375/260 |
| 2001/0038670 | A1 * | 11/2001 | Whight | 375/267 |
| 2004/0166802 | A1 * | 8/2004 | McKay et al. | 455/15 |
| 2006/0172710 | A1 * | 8/2006 | Cahana et al. | 455/101 |
| 2006/0193271 | A1 * | 8/2006 | Proctor et al. | 370/294 |
| 2007/0010198 | A1 * | 1/2007 | McKay, Sr. | 455/10 |
| 2008/0159200 | A1 | 7/2008 | Lee | |
| 2008/0293358 | A1 * | 11/2008 | Andersson et al. | 455/8 |
| 2009/0034448 | A1 * | 2/2009 | Miller et al. | 370/316 |

FOREIGN PATENT DOCUMENTS

| EP | 1538762 A2 | 6/2005 |
| WO | 9929051 A1 | 6/1999 |

* cited by examiner

*Primary Examiner* — Chieh M Fan
*Assistant Examiner* — Santiago Garcia
(74) *Attorney, Agent, or Firm* — Rothwell, Figg, Ernst & Manbeck, P.C.

(57) ABSTRACT

A base station repeater station pair, comprising: a base station (1) having an input for a broadcast signal (s(t)) and being arranged to transmit, in use, a transfer signal over a link (3) using electromagnetic (EM) radiation; and a repeater station (2) arranged to receive, in use and through EM radiation, the transfer signal from the base station (1) and from the transfer signal broadcast the broadcast signal using EM radiation, in which the link (3) between the base station (1) and the repeater station (2) over which the transfer signal is passed in use comprises a dual polarized link, whereby the base station (1) is arranged to transmit the transfer signal over the link (3) with two different polarizations, and the repeater station (2) is arranged to receive the transfer signal from the link as two differently polarized versions. Also disclosed area base station and a method of using the above.

7 Claims, 2 Drawing Sheets

BASE AND REPEATER STATIONS

CROSS-REFERENCE TO RELATED APPLICATION

This application is a 35 U.S.C. §371 National Phase Entry Application from PCT/EP2008/059287, filed Jul. 16, 2008, and designating the United States.

TECHNICAL FIELD

This invention relates to base and repeater stations, such as are used, for example only, in pairs to broadcast signals from different locations.

BACKGROUND

In wireless communications networks one can use repeater stations (RS) to, e.g., enhance the rank of Multiple-Input Multiple-Output (MIMO) channels and/or to cover areas that are difficult to cover with a single base station (BS). For example, a building might be obstructing the signal path in such way that some areas have limited signal coverage. A repeater station can then successfully be used to extend the signal to cover such shaded areas.

Since focusing the transmitted base station signal in favourable directions, so-called beamforming or beamsteering, is known to enhance the received signal strength for some users and at the same time limit the interference to other users, it is desirable to enable repeater stations to also perform beamforming. However, since the base station is the advanced entity that has channel information and a simple repeater station such as an amplify and forward (AF) repeater has limited functionality it has been thought advantageous to let the base station remotely control the repeater station signalling.

SUMMARY

According to a first aspect of the invention, there is provided a base station—repeater station pair, comprising:
 a base station having an input for a broadcast signal and being arranged to transmit, in use, a transfer signal over a link using electromagnetic (EM) radiation; and
 a repeater station arranged to receive, in use and through EM radiation, the transfer signal from the base station and from the transfer signal broadcast the broadcast signal using EM radiation,
in which the link between the base station and the repeater station over which the transfer signal is passed in use comprises a dual polarised link, whereby the base station is arranged to transmit the transfer signal over the link with two different polarisations, and the repeater station is arranged to receive the transfer signal from the link as two differently polarised versions.

This therefore represents a novel use of polarisation diversity, and therefore makes the base station to repeater station link more reliable. Preferably, the base station is also arranged so as to broadcast using EM radiation the broadcast signal, in use.

However, the inventive use of such polarisation diversity can be extended from the above. The repeater station may comprise two broadcast antennas on which the broadcast signal is transmitted, the repeater station being arranged such that the relative amplitude and phase of the broadcast signal as transmitted from the broadcast antennas may depend upon the relative amplitude and phase of the two received transfer signal versions. Indeed, in the simplest case, the repeater station is arranged such that, as between the two received versions of the transfer signal on the one hand and the broadcast signal as transmitted on the two broadcast antennas on the other, one or both of the ratio of the amplitudes of the two signals and the phase difference between them is preserved.

This provides a very simple method of remote control of a repeater station by the base station. By varying the ratio of amplitudes and/or the relative phases of the two versions it transmits and so the ratio of amplitudes and/or the relative phases of the versions that are received at the repeater station, the base station can control the relative amplitude and/or phase of the signals transmitted by the broadcast antennas on the repeater station.

Thus, the signals at the two broadcast antennas can be controlled simply at the base station without significant processing being carried out at the repeater stations. Indeed, the repeater station may only amplify each version of the transfer signal before transmitting such on a respective broadcast antenna.

As such, the base station may comprise two differently polarised transfer antennas, which form part of the link and from which the transfer signal is transmitted in use. Equally, the repeater station may comprise two differently polarised transfer antennas, which form part of the link and on each of which the repeater station is arranged to receive one of the versions of the transfer signal. In the preferred embodiment, the transfer antennas of either but preferably both the base and repeater stations are orthogonally polarised with respect to each other. They may be linearly cross polarised, or may be circularly polarised of opposite senses.

Accordingly, each transfer antenna in the repeater may be connected to a respective broadcast antenna in the repeater. Typically, the connection may be through an amplifier. However, there may not be a need for any other signal processing equipment between the transfer antennas and the broadcast antennas in the repeater station.

The repeater station may also comprise a hybrid network, the transfer antennas in the repeater station being connected to the broadcast antennas in the repeater station by means of the hybrid network. In particular, the hybrid network may comprise a Butler matrix, such as a 2×2 Butler matrix. The hybrid network may be arranged so as to, in use, take the signals received at the repeater station transfer antennas and to process them and output the processed signals to the repeater station broadcast antennas, such that the phase difference in the processed signals depends on the relative amplitudes of versions of the transfer signal and the relative amplitudes of the processed signals depends upon the phase difference between the versions of the transfer signal. Preferably, an amplifier is also provided for each transfer antenna in the repeater station, in which the amplifier is connected between the relevant transfer antenna and the hybrid network.

As such, this is advantageous, as it allows the base station to control the relative amplitudes of the signals broadcast at the broadcast antennas of the repeater station by changing the relative phase of the versions of the transfer that it transmits. This means that the amplifiers in the repeater station can be used to amplify signals by the same amount, thus balancing the load on the repeater station amplifiers.

There is no necessity for the repeater station antennas to be differently polarised, although it is possible that they are, in which case the broadcast signal would be broadcast with polarisation diversity. However, it is preferred that the broadcast antennas on the repeater station are spaced apart, so as to form an antenna array. The antenna array of the repeater station may be arranged such that, in use, a combined beam is formed. In the case where the base station can control the relative phases and amplitudes of the signals transmitted from the broadcast antennas on the repeater station, the pair may be arranged such that the combined beam may be steered and/or shaped by varying the relative phase and/or amplitude of the signals transmitted over the link.

The base station comprise two phase and/or amplitude modulators and may be arranged so as to apply the broadcast signal to the two phase and/or amplitude modulators, the phase and/or amplitude modulators being arranged so as to, in use, apply different shifts in amplitude and/or phase to the broadcast signal, and to output the respective resultant signals to respective ones of the transfer antennas.

The broadcast signal may comprise two sub-signals, in which the phase and/or amplitude modulators are arranged to apply different shifts to the two sub-signals. The shifts may be such that each of the sub-signals is transmitted from a different broadcast antenna at the repeater station.

The repeater station may comprise at least one uplink antenna, in which the repeater station is arranged to receive signals from the uplink antennas, and transmit them over the dual polarised link to the base station. Thus a duplex link can be achieved. The or each uplink antenna may comprise one or more of the broadcast antennas.

The broadcast and/or transfer signals may comprise radio waves, typically within the radio or microwave spectrums.

According to a second aspect of the invention, there is provided a repeater station having two transfer antennas on which the repeater station is arranged to receive a transfer signal comprising electromagnetic (EM) radiation, two broadcast antennas on which the repeater station is arranged to transmit a broadcast signal comprising EM radiation dependent upon the transfer signal, in which the two transfer antennas are differently polarised.

This can give the repeater station receive polarisation diversity, and may allow for the advantageous embodiment set out below.

The repeater station may be arranged such that the relative amplitude and phase of the broadcast signal as transmitted from the broadcast antennas may depend upon the relative amplitude and phase of the transfer signal as received at the two transfer antennas. Indeed, in the simplest case, the repeater station is arranged such that, as between the transfer signal as received at the two transfer antennas on the one hand and the broadcast signal as transmitted on the two broadcast antennas on the other, one or both of the ratio of the amplitudes of the two signals and the phase difference between them is preserved.

This provides a very simple method of remote control of a repeater station by a base station. By varying the ratio of amplitudes and/or the relative phases of the two versions it transmits and so the ratio of amplitudes and/or the relative phases of the versions that are received at the repeater station, the base station can control the relative amplitude and/or phase of the signals transmitted by the broadcast antennas on the repeater station.

Indeed, the repeater station may be arranged only as to amplify each version of the transfer signal before transmitting such on a respective broadcast antenna.

In the preferred embodiment, the transfer antennas are orthogonally polarised with respect to each other. They may be linearly cross polarised, or may be circularly polarised of opposite senses.

Accordingly, each transfer antenna in the repeater station may be connected to a respective broadcast antenna in the repeater. Typically, the connection may be through an amplifier. However, there may not be a need for any other signal processing equipment between the transfer antennas and the broadcast antennas in the repeater station.

The repeater station may also comprise a hybrid network, the transfer antennas in the repeater station being connected to the broadcast antennas in the repeater station by means of the hybrid network. In particular, the hybrid network may comprise a Butler matrix, such as a 2×2 Butler matrix. The hybrid network may be arranged so as to, in use, take the signals received at the repeater station transfer antennas and to process them and output the processed signals to the repeater station broadcast antennas, such that the phase difference in the processed signals depends on the relative amplitudes of versions of the transfer signal and the relative amplitudes of the processed signals depends upon the phase difference between the versions of the transfer signal. Preferably, an amplifier is also provided for each transfer antenna in the repeater station, in which the amplifier is connected between the relevant transfer antenna and the hybrid network.

As such, this is advantageous, as it allows the base station to control the relative amplitudes of the signals broadcast at the broadcast antennas of the repeater station by changing the relative phase of the versions of the transfer that it transmits. This means that the amplifiers in the repeater station can be used to amplify signals by the same amount, thus balancing the load on the repeater station amplifiers.

There is no necessity for the broadcast antennas to be differently polarised, although it is possible that they are, in which case the broadcast signal would be broadcast with polarisation diversity. However, it is preferred that the broadcast antennas are spaced apart, so as to form an antenna array. The antenna array of the repeater station may be arranged such that, in use, a combined beam is formed. In such a case, the repeater station may be arranged such that the combined beam may be steered and/or shaped by varying the relative phase and/or amplitude of the transfer signals.

The repeater station may comprise at least one uplink antenna, in which the repeater station is arranged to receive signals from the uplink antennas, and transmit them over the dual polarised link to the base station. Thus a duplex link can be achieved. The or each uplink antenna may comprise one or more of the broadcast antennas.

According to a third aspect of the invention, there is provided a base station comprising an input for a broadcast signal, an antenna arranged to broadcast using electromagnetic (EM) radiation the broadcast signal in use and two differently polarised transfer antennas for transmitting using EM radiation a transfer signal to a repeater station such that the repeater station can rebroadcast the broadcast signal.

This therefore represents a novel use of polarisation diversity, and therefore makes the base station to repeater station link more reliable.

However, the inventive use of such polarisation diversity can be extended from the above.

The base station comprise two phase and/or amplitude modulators and may be arranged so as to apply the broadcast signal to the two phase and/or amplitude modulators, the phase and/or amplitude modulators being arranged so as to, in use, apply different shifts in amplitude and/or phase to the broadcast signal, and to output the respective resultant signals to respective ones of the transfer antennas. This may allow for a repeater station to transmit different versions of the broadcast signal on different antennas as described above with respect to the preceding aspects.

In the preferred embodiment, the transfer antennas are orthogonally polarised with respect to each other. They may be linearly cross polarised, or may be circularly polarised of opposite senses.

The broadcast signal may comprise two sub-signals, in which the phase and/or amplitude modulators are arranged to apply different shifts to the two sub-signals. The shifts may be such that each of the sub-signals is transmitted from a different broadcast antenna at the repeater station.

The broadcast and/or transfer signals may comprise radio waves, typically within the radio or microwave spectrums.

The base station may be arranged to receive signals from a repeater station over the link. Thus a duplex link can be achieved.

The repeater station of the second aspect of the invention together with the base station of the third aspect of the invention may together form a pair according to the first aspect of the invention.

According to a fourth aspect of the invention, there is provided a method of operating a base station—repeater station pair, the pair comprising a base station arranged and a repeater station, the method comprising:
  receiving at the base station a broadcast signal;
  transmitting a transfer signal from the base station to the repeater station over a dual polarised electromagnetic (EM) radiation link;
  broadcasting the broadcast signal from the repeater station using EM radiation.

This therefore represents a novel use of polarisation diversity, as the transfer signal is transmitted and received with two different polarisations, and therefore makes the base station to repeater station link more reliable. Preferably, the base station also broadcasts, using EM radiation, the broadcast signal.

However, the inventive use of such polarisation diversity can be extended from the above. Where the repeater station comprises two broadcast antennas on which the broadcast signal is transmitted and the repeater station receives two differently polarised versions of the transfer signal, the relative amplitude and phase of the broadcast signal as transmitted from the broadcast antennas may depend upon the relative amplitude and phase of the two received transfer signal versions. Indeed, in the simplest case, as between the two received versions of the transfer signal on the one hand and the broadcast signal as transmitted on the two broadcast antennas on the other, one or both of the ratio of the amplitudes of the two signals and the phase difference between them is preserved.

This provides a very simple method of remote control of a repeater station by the base station. By varying the ratio of amplitudes and/or the relative phases of the two versions it transmits and so the ratio of amplitudes and/or the relative phases of the versions that are received at the repeater station, the base station can control the relative amplitude and/or phase of the signals transmitted by the broadcast antennas on the repeater station.

Thus, the signals at the two broadcast antennas can be controlled simply at the base station without significant processing being carried out at the repeater stations. Indeed, the repeater station may only amplify each version of the transfer signal before transmitting such on a respective broadcast antenna.

The method may also comprise processing the received versions of the transfer signal in repeater station such that such that phase differences in the processed signals depends on the relative amplitudes of the versions of the transfer signal and the relative amplitudes of the processed signals depends upon the phase difference between the versions of the transfer signal, and transmitting the processed signals from the repeater station broadcast antennas. Typically, this may employ a hybrid network in the repeater station, such as a 2×2 Butler matrix. The method may also comprise amplifying each received transfer signal version in the repeater station before processing it.

As such, this is advantageous, as it allows the base station to control the relative amplitudes of the signals broadcast at the broadcast antennas of the repeater station by changing the relative phase of the versions of the transfer that it transmits. This means that the amplifiers in the repeater station can be used to amplify signals by the same amount, thus balancing the load on the repeater station amplifiers.

In the preferred embodiment, the two versions of the transfer signal are orthogonally polarised with respect to each other. They may be linearly cross polarised, or may be circularly polarised of opposite senses.

Where the broadcast antennas on the repeater station are spaced apart, so as to form an antenna array, the broadcast signal may be of the form of a combined beam. By controlling, at the base station the relative phases and amplitudes of the signals transmitted from the broadcast antennas on the repeater station, method may comprise steering and/or shaping the combined beam by varying the relative phase and/or amplitude of the transfer signal versions.

The method may comprise applying at the base station different shifts in amplitude and/or phase to the broadcast signal, and transmitting the resultant signal as respective versions of the transfer signal.

The broadcast signal may comprise two sub-signals, in which different phase and/or amplitude shifts are applied to the two sub-signals. The shifts may be such that each of the sub-signals is transmitted from a different broadcast antenna at the repeater station.

The repeater station may comprise at least one uplink antenna, in which the repeater station receives signals from the uplink antennas, and transmits them over the dual polarised link to the base station. Thus a duplex link can be achieved. The or each uplink antenna may comprise one or more of the broadcast antennas.

The broadcast and/or transfer signals may comprise radio waves, typically within the radio or microwave spectrums.

Herein, the invention is described using the term "antenna". It should be noted that the term "antenna" could possibly, but not necessarily represent an "antenna function" and that multiple antenna functions can be realized in different configurations of physical antenna units. For example, a dual-polarized antenna may be a single unit providing two different antenna functions, in this case radiation patterns with essentially orthogonal polarization.

DETAILED DESCRIPTION

Herein, upper case bold letters are used for matrices; lower case bold letters are used for vectors. Superscript$^T$ indicates transposition. The function diag($x_1, \ldots, x_N$) is the N by N diagonal matrix with the elements $x_1, \ldots, x_N$ on its main diagonal.

Figure 1:
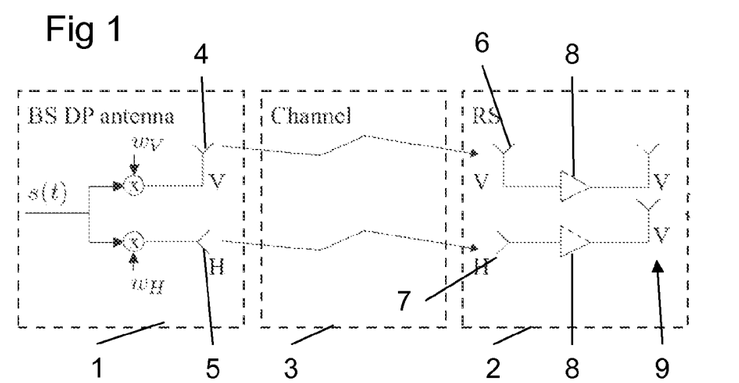
FIG. 1 shows a base station—repeater station according to a first embodiment of the invention.

FIG. 1 of the accompanying drawings depicts a system according to a first embodiment of the invention. The system comprises a base station—repeater station pair, comprising a base station 1 and a repeater station 2.

The base station 1 receives a signal to be broadcast—herein a broadcast signal s(t)—and transmits a transfer signal with two orthogonal polarisations over a dual polarised link 3. The base station comprises two transfer antennas 4, 5; the first 4 has vertical polarisation (V) whereas the second 5 is horizontally polarised (H). It can therefore be seen that the transfer antennas 4, 5 are orthogonally polarised.

The repeater station also comprises complementarily polarised transfer antennas 6, 7 which are respectively orthogonally V and H polarised. The link 3 between the base station and the transfer station is therefore formed by the base station 1 transmitting the transfer signal from its transfer antennas 4, 5 to the transfer antennas 6, 7 of the repeater station 2. The repeater also comprises two broadcast antennas 9, which have the same vertical polarisation V.

The transfer signal is formed by applying two weights $w_V$ and $w_H$ to the broadcast signal s(t). The weights can be complex, in that they represent a change in both amplitude and phase with respect to the broadcast signal.

The signals thus transmitted over the link 3 then propagate independently, whereafter they are received by the transfer antennas 6, 7 at the repeater station 2. The repeater station 2 comprises two independent signal paths for the versions of the transfer signal received. Each signal path comprises an amplifier 8 which connects one of the receive antennas and amplified and forwarded to one of the broadcast antennas 9 on the repeater station.

Since a dual polarised link 3 is employed and the distance between the base station 1 and the repeater station 2 is the same for both polarizations, the two polarizations will in a line of sight (LOS) situation experience the same phase changes and path losses when conveyed over the channel. This is confirmed in the article "On the modelling of a polarized MIMO channel" by Lei Jiang, Lars Thiele and Volker Jungnickel (13th European Wireless Conference, Paris, France, April 2007, herein "Jiang et al"), the disclosure of which is hereby incorporated by reference. Jiang et al notes that dual polarised links per se are known.

However, the identical phase changes and path losses will set phase coherency requirements on antennas and radio chains. One can, for example, choose to dedicate high gain transfer antennas 4, 5 at the base station 1 to serve the repeater station 2 while letting other base station antennas (not shown) serve users around the base station 1 or one can let the other base station antennas together with the repeater station 2 broadcast antennas 9 form a distributed antenna system (DAS) which, thanks to the large separation between the base station 1 and the repeater station 2 can provide low correlation between the repeater station broadcast antennas 9 and the other base station antennas. Preferably, the transfer antennas 6, 7 at the repeater station 2 is also a high gain antenna pointing towards the base station 1.

We assume a line of sight channel which in principle obeys free-space wave propagation. The received field at the repeater station can, thus, be obtained as set out in Jiang et al:

$$h = \frac{e^{-jkd}}{d} G\cos\theta_p, \quad (1)$$

where $k=(2\pi)/\lambda$, $\lambda$ being the wavelength used, d is the distance between the base 1 and repeater 2 stations, G represents the field amplification introduced both by the transmit and receive antennas, and $\theta_p$ is a polarization mismatch angle.

If the transfer antenna 4, 5, 6, 7 polarizations are perfectly aligned then $\theta_p=0$. Equation (1) is valid for both V and H polarized waves and, thus, we note that the path loss and phase change are identical for both polarizations as long as the distance d and wavelength $\lambda$ are identical for both polarizations. This can be achieved by using antennas that have a common phase centre for both polarisations.

Furthermore, we assume that the antenna amplification is identical for both polarizations and without loss of generality we can set it to unity, i.e., G=1. When deploying a link 3 which is a point to point link, we assume that the polarizations can be perfectly aligned by a simple measurement such that $\theta_p=0$.

We can, hence, represent dual polarised MIMO channel between the base station 1 and repeater station 2 by the following matrix:

$$H = \frac{e^{-jkd}}{d}\begin{bmatrix} 1 & 0 \\ 0 & 1 \end{bmatrix}. \quad (2)$$

Note that from (2) there is no cross-coupling between the polarisations (the off-diagonal elements of the channel matrix are zero) thanks to the perfect polarisation alignment. The validity of the channel model has been studied in Jiang et al, where the channel models used by equations (1) and (2) were used and experimentally verified with very good results for a line of sight channel.

The received signal at the repeater station 2 can be given by $$x_{RS}(t)=Hs_{BS}(t) \quad (3)$$

where $s_{BS}$ is the signal transmitted from the base station and is given by $$s_{BS}(t)=w_{BS}s(t) \quad (4)$$

where s(t) is the scalar broadcast signal to be waveformed. The weights are given by $W_{BS}=[w_V,w_H]^T$, where $w_V$ and $w_H$ are the weights applied to the broadcast signal as discussed above.

The resultant repeater station beamformer can be depicted by:

$$w_{RS} = AHw_{BS} = \frac{e^{-jkd}}{d}\begin{bmatrix} A_V & 0 \\ 0 & A_H \end{bmatrix} w_{BS}. \quad (5)$$

where $A=\text{diag}(A_V,A_H)$ is the diagonal repeater amplification matrix which represents the amplification that the amplify and forward repeater station 2 employs to the two polarisations. However, since the path-losses for the two polarisations are the same, the amplifications should also be the same; i.e. $A_V=A_H$, so that the resultant beam shape is unaltered.

Since beamforming by only using two antenna elements is quite limited, we will instead consider beamsteering. Beamsteering is achieved by introducing a phase shift of the signal transmitted by one antenna relative to the other antenna. That is, we let:

$$w_{BS} = \Phi\begin{bmatrix} 1 \\ e^{-j\phi} \end{bmatrix}, \quad (6)$$

where $\phi$ is the steering angle attained at the repeater station 2 broadcast antennas and the matrix $\Phi$ is introduced to compensate for imperfections that might be caused by the antennas, radio chains, etc. For example, if the antennas introduce phase shifts on each polarisation then the matrix $\Phi=\mathrm{diag}(e^{j\Theta_V}, e^{j\Theta_H})$ can be used to compensate for these. To this end, we assume that such imperfections are known to the base station 1 so that it can cancel them out which then yields the resulting repeater station 2 beamsteering vector $$w_{RS} = \frac{1}{d} A \begin{bmatrix} 1 \\ e^{-j\phi} \end{bmatrix}, \quad (7)$$

where the factor 1/d represents the path-loss over the base station 1 to repeater station 2 link 3. Since the repeater station 2 has amplify and forward functionality it can also amplify the steered beam to compensate for the path loss. To do so, we can choose $A_V=A_H=d$. However, the path loss and choice of amplification (assuming $A_V=A_H$) do not have any effect on the beamsteering angle and it is only a matter of beam amplification. Finally, by using a dual polarised link 3, the beam from the repeater station 2 broadcast antennas 9 can be steered by varying the angle $\Phi$ in the base station weight vector given in (6) above.

The beam-steering in the repeater station 2, as achieved by the phase and/or amplitude weighting of the signals transmitted from base station 1, can be applied in arbitrary directions, as given by the relative positions, pointing directions, radiation patterns, and polarization of the repeater station broadcast antennas 9.

In a first example, with two identical antennas 9 pointing in the same direction, the antennas being located in a common horizontal plane, the beam-steering may result in a horizontal steering or, more generally, azimuthal steering around a vertical axis of the beam resulting from combining the radiation from the two repeater station broadcast antennas 9.

In a second example, with two identical repeater station broadcast antennas pointing in the same direction, the antennas being located in a common vertical plane, the beam-steering may result in a vertical steering of the beam (i.e., beam-steering in the elevation domain) resulting from combining the radiation from the two repeater station broadcast antennas.

If the line of sight channel for each polarisation introduces an unknown time-invariant phase and/or amplitude change and thus the resulting beam form at the repeater station broadcast antennas 9 becomes unknown, then the base station can use the strategy of slowly varying the beamformer weights from (6) above over a longer timescale at the same time log statistics of users' signal quality reports. Then the system can use the collected statistics to choose the beam weights that according to some desired criterion yield the best performance for a particular time frame and adjust the weights for the next time frame, and so on in a self-tuning fashion.

Figure 2:
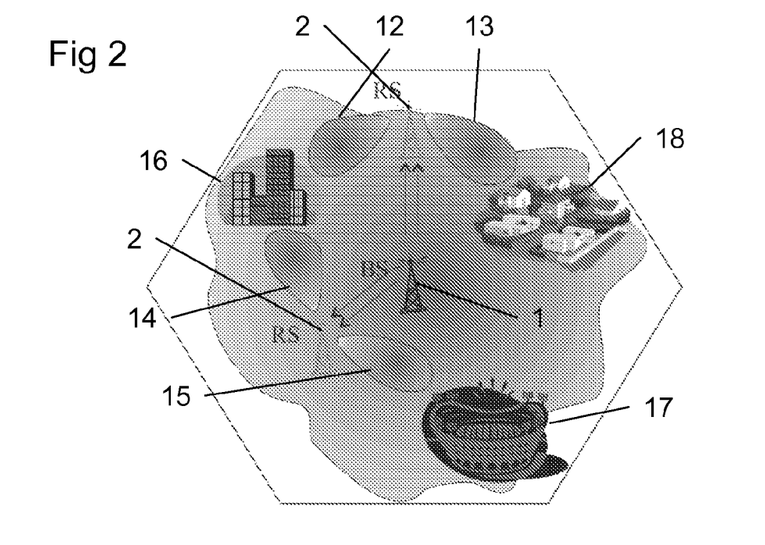
FIG. 2 shows the base station—repeater station pair of FIG. 1 employed in a city environment.

The time frames can be, for example, morning, day, evening and night. For example, as depicted in FIG. 2, a pair of repeater stations 2 can be controlled by a single base station 1 having two pairs of transfer antennas, each having different a set of weights applied to the broadcast antennas. This means that the beams of each set can be steered independently. For example, the beam positions can be varied between the different positions 12, 13, 14, 15 shown. As such, the repeater station beams can be directed at city centre 16, stadium 17 or residential area 18 depending upon where the greatest demand is.

In a non-line of sight (NLOS) situation, there will be an increased cross interference between the two polarizations and the channel is also considered random. Since the link 3 in NLOS is considered random, the resulting repeater station beamformer will also be random in NLOS. Thus the system can be considered a random beamforming scheme and these kind of schemes can be used in, e.g., an opportunistic beamforming context where random beams are generated and the users report back their respective channel quality indicator (CQI), whereafter the users are scheduled.

If, however, the characteristics of the link 3 is known to the base station 1 then the base station 1 can pre-equalize the impact of the NLOS link 3 to create deterministic repeater station 2 beams.

Figure 3:
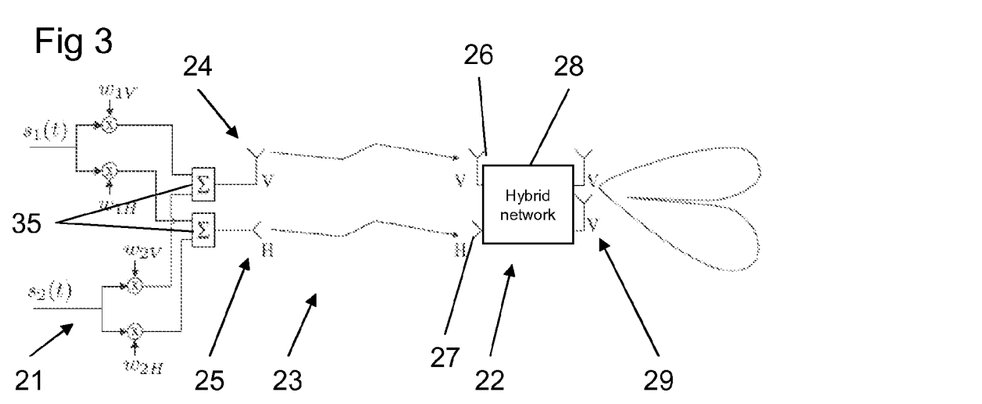
FIG. 3 shows a base station—repeater station pair according to a second embodiment of the invention.

According to a second embodiment of the invention depicted in FIG. 3 of the accompanying drawings, the invention can also be used for dual stream (DS) transmission over dual beams at the repeater station 22 where the beams are chosen at the base station 21. The operation of this embodiment is similar to that of the first embodiment of the invention described with reference to FIG. 1 of the accompanying drawings; equivalent integers have been indicated with the same reference numerals raised by 20.

DS transmission can be considered to be the transmission of two sub-signals within the transfer signal. If one wants orthogonality between the beams one simply sets the inner product between the two beamforming vectors to zero, i.e.:

$$w_1^H w_2 = w_{1V}^* w_{2H} + w_{1H}^* w_{2H} = 0 \quad (8)$$

The weights can be seen in FIG. 3. In this case, two sub-signals $s_1(t)$ and $s_1(t)$ are to be broadcast from the repeater station broadcast antennas 29. Weights $w_{1V}$ and $W_{1H}$ are applied to sub-signal $s_1(t)$ to give components to be applied to each transfer antenna 24, 25, and similarly weights $w_{2V}$ and $w_{2H}$ are applied to sub-signal $s_2(t)$ to give components to be applied to each transfer antenna 25, 26. The components for each transfer antenna 25, 26 are summed at summers 35 before being applied to the transfer antenna 25, 26. In one possible embodiment, the repeater station 22 can still simply amplifies and forwards the received transfer signals to its broadcast antennas 29. This is useful where beamsteering is desired to be employed.

However, in the embodiment shown in FIG. 3 of the drawings, the repeater station 22 comprises a hybrid network 28 in place of the amplifiers 8 of FIG. 1. The hybrid network 28 is a fixed network of hybrid combiners, such as a Butler matrix, which directs the signals from the repeater station transfer antennas 26, 27 to the two repeater station broadcast antennas 29 in accordance with the signals' amplitude and phase.

In one embodiment, the repeater station 22 comprises two orthogonally polarized transfer antennas 26, 27, two amplifiers, one per antenna, one 2×2 hybrid matrix comprising a Butler matrix and a dual-polarized repeater station broadcast antenna 29. Due to the operation of the Butler matrix—a well known component in the field of antennas—this embodiment allows the base station 21 to control the realized polarization of the transmitted signal from the two repeater station broadcast antennas 29 by selecting the relative phase of signals transmitted via two orthogonally polarized base station transfer antennas 24, 25. The relative phase of the two power-amplified equal-amplitude signals at the input ports of the 2×2 hybrid matrix controls the relative amplitude on the output ports of the 2×2 hybrid matrix. Thus, this embodiment provides a solution in which the base station beamformer controls the resulting polarization of the signals transmitted from the dual-polarized repeater station broadcast antenna 29 while maintaining balanced power amplifier usage in the repeater station amplifiers.

Alternatively, the repeater station 22 may have repeater station broadcast antenna pointing in different, in general arbitrary, directions. This allows the base station beamformer to control the relative signal amplitude in the two different repeater station broadcast antennas, and thus the radiated power in two different directions, while maintaining balanced power amplifier usage in the repeater station amplifiers. This is because the signal is amplified before it is passed through the Butler matrix, and at that stage desired differences in power at the broadcast antennas can be indicated by changes in the relative phase of the transfer signals, phase differences not requiring any difference in amplification power. Any power division can be realized between the two extremes in which all the power is directed to one or the other repeater station broadcast antenna 29.

As such, the link 3 could be used to link each sub-signal to respective ones of the broadcast antennas 29.

In this context, one can interpret the weighting matrix $W=[w_1 \; w_2]$, where $w_1=[w_{1V} w_{1H}]^T$ and $w_2=[W_{2V} W_{2H}]^T$, as a precoding matrix in a precoded system where the transmitting base station 21 uses precoding matrices consisting of individual precoding vectors for each stream.

Figure 4:
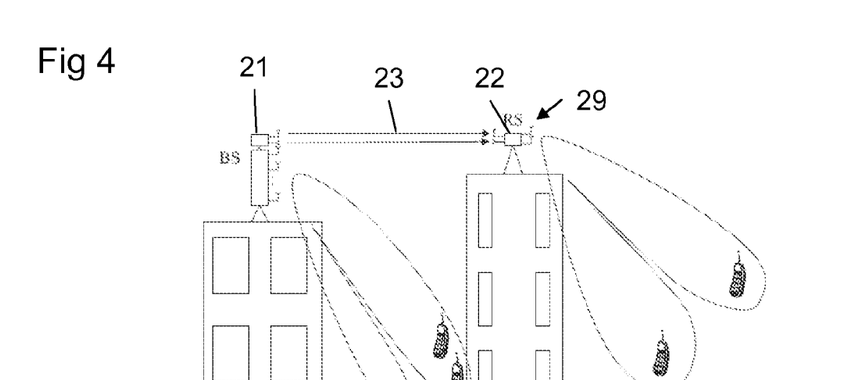
FIG. 4 shows the base station—repeater station pair of FIG. 3 being used to avoid a large building.

FIG. 4 shows an example deployment of a repeater station 22 with dual stream transmission and base station 21 controlled beamforming via a dual polarised link 23 in order to bypass an obstructing building 36.

Furthermore, the broadcast antennas 29 on the forward side of the repeater station 22 (the antennas communicating with the users) do not necessarily need to be of the same polarisation. That is, if one wants to exploit polarization multiplexing instead of spatial multiplexing one can simply amplify and forward the polarizations that are transmitted over the base station to repeater station link. By doing so, one can forward, to the users, dual data streams over different polarizations instead of over different spatial beams.

Assuming that the characteristics of the composite up-link (UL) channel (composed of a mobile station to base station via a repeater station channel and, if applicable, a direct mobile station to base station channel) are known to the base station, (the receiver usually always knows the channel) then the base station can achieve receive antenna diversity gain by, for example, employing maximum ratio combining (MRC) among the receive antennas.

Additionally, if one instead wants to exploit polarization diversity instead of spatial diversity one can also here amplify and forward the dual polarised transfer signals instead of changing the forwarded signals to single polarized signals.

However, If the composite downlink channel is unknown to the base station then the base station can use its two transmit antennas and an antenna on the repeater station to determine the qualities to the link. It may use the scheme proposed in S. M. Alamouti: "A Simple Transmit Diversity Technique for Wireless Communications" (IEEE Journal on Selected Areas in Communications, 16:1451-1458, 1998), the disclosure of which is hereby incorporated by reference, to achieve transmit diversity. Finally, if the composite downlink channel is known to the base station then the base station can use transmit antenna combining to achieve transmit diversity gain.

Additionally, if one instead wants to exploit polarization diversity instead of spatial diversity one can also here amplify and forward the transfer signals instead of changing the forwarded signals to single polarized signals.

The dual polarised links proposed are a way to connect antennas that have a larger spatial separation. For example, repeater stations can be seen as a way of re-distributing the conventional base station coverage and solve local coverage issues, e.g., by-passing obstructing buildings, etc. Since the spatial separation between base station and repeater station might be quite large, the use of conventional feeder cables may be impractical. The invention enables the base station to remotely control the repeater station which is a desired feature since it is most likely the base station (and not the more simple repeater station) that is the advanced entity that, for example, has access to channel information.

While FIGS. 1 and 3 show downlink radio chains, corresponding uplink radio chains can be present, assuming that the repeater station provides duplex functionality. In duplex operation, uplink signals are routed from the repeater station broadcast antennas, via repeater station uplink amplifiers, to the transfer antennas for transmission to the base station. Duplex functionality, a well-known concept often implemented using duplex filters, for a frequency-division duplex (FDD) system, or switches, for a time-division duplex (TDD) system, separates downlink and uplink signals such that they are routed via the proper duplex radio chain for amplification.

The invention claimed is:

1. A base station—repeater station pair, comprising:
   a base station having an input for a broadcast signal and being arranged to transmit, in use, a transfer signal over a link using electromagnetic (EM) radiation; and
   a repeater station arranged to receive, in use and through EM radiation, the transfer signal from the base station and from the transfer signal broadcast the broadcast signal using EM radiation,
   in which the link between the base station and the repeater station over which the transfer signal is passed in use comprises a dual polarised link, whereby the base station is arranged to transmit the transfer signal over the link with two different polarisations, and the repeater station is arranged to receive the transfer signal from the link as two differently polarised versions,
   in which the base station comprises two differently polarised transfer antennas, which form part of the link and from which the transfer signal is transmitted in use, in which the repeater station comprises two differently polarised transfer antennas, which form part of the link and on each of which the repeater station is arranged to receive one of the versions of the transfer signal; and two broadcast antennas on which the broadcast signal is broadcast,
   in which the repeater station broadcast antennas are not differently polarized,
   in which the base station comprises two phase and/or amplitude modulators and is arranged so as to apply the broadcast signal to the two phase and/or amplitude modulators, the phase and/or amplitude modulators being arranged so as to, in use, apply different shifts in amplitude and/or phase to the broadcast signal, and to output the respective resultant signals to respective ones of the transfer antennas,
   in which the broadcast signal comprises two sub-signals, in which the phase and/or amplitude modulators are arranged to apply different shifts to the two sub-signals, and
   in which the shifts are such that each of the sub-signals is transmitted from a different broadcast antenna at the repeater station.

2. The pair of claim 1, in which the base station is also arranged so as to broadcast using EM radiation the broadcast signal, in use.

3. The pair of claim 1, in which the repeater station is arranged such that the relative amplitude and phase of the broadcast signal as transmitted from the broadcast antennas depends upon the relative amplitude and phase of the two received transfer signal versions.

4. The pair of claim 3, in which the repeater station is arranged such that one or both of the ratio of the amplitudes of the transfer signal and the broadcast signal and the phase difference between them is preserved.

5. The pair of claim 1, in which the broadcast antennas on the repeater station are spaced apart, so as to form an antenna array and in which the antenna array of the repeater station is arranged such that, in use, a combined beam is formed, and in which the base station is arranged to control the relative phases and amplitudes of the signals transmitted from the broadcast antennas on the repeater station, the pair being arranged such that the combined beam can be steered and/or shaped by varying the relative phase and/or amplitude of the signals transmitted over the link.

6. A method of operating a base station—repeater station pair, the pair comprising a base station having an input for a broadcast signal, two differently polarised transfer antennas, and two phase and/or amplitude modulators, a repeater station having two differently polarised transfer antennas and two broadcast antennas, in which the repeater station broadcast antennas are not differently polarised, and a dual polarised electromagnetic (EM) radiation link between the base station and the repeater station, the method comprising:

receiving at the base station a broadcast signal, applying at the base station the broadcast signal to the two phase and/or amplitude modulators, the phase and/or amplitude modulators being arranged so as to, in use, apply different shifts in amplitude and/or phase to the broadcast signal,
 in which the broadcast signal comprises two sub-signals, in which the phase and/or amplitude modulators are arranged to apply different shifts to the two sub-signals,
 in which the shifts are such that each of the sub-signals is transmitted from a different broadcast antenna at the repeater station;

transmitting a transfer signal from the base station to the repeater station over the dual polarised EM radiation link using the two differently polarised transfer antennas of the base station, the repeater station receiving two differently polarised versions of the transfer signal using the two differently polarised transfer antennas of the repeater station; and broadcasting the broadcast signal from broadcast antennas of the repeater station using EM radiation.

7. The method of claim 6, in which the relative amplitude and phase of the broadcast signal as transmitted from the broadcast antennas depends upon the relative amplitude and phase of the two received transfer signal versions.

\* \* \* \* \*

UNITED STATES PATENT AND TRADEMARK OFFICE
CERTIFICATE OF CORRECTION

PATENT NO. : 8,594,158 B2  Page 1 of 1
APPLICATION NO. : 13/003907
DATED : November 26, 2013
INVENTOR(S) : Coldrey et al.

It is certified that error appears in the above-identified patent and that said Letters Patent is hereby corrected as shown below:

On the Title Page, in Item (75), under "Inventors", in Column 1, Line 2, delete "Molndal" and insert -- Mölndal --, therefor.

On the Title Page, in Item (75), under "Inventors", in Column 1, Line 3, delete "Savedalen" and insert -- Sävedalen --, therefor.

In the Specification

In Column 8, Line 46, in Equation (5), delete " $w_{RS} = AHw_{BS} = \frac{e^{-jkd}}{d}\begin{bmatrix} A_V & 0 \\ 0 & A_H \end{bmatrix} w_{BS},$ " and insert -- $w_{RS} = AHw_{BS} = \frac{e^{-jkd}}{d}\begin{bmatrix} A_V & 0 \\ 0 & A_H \end{bmatrix} w_{BS},$ --, therefor.

In Column 10, Line 28, in Equation (8), delete " $w_1^H w_2 = w_{1V}^* w_{2H} + w_{1H}^* w_{2H} = 0$ " and insert -- $w_1^H w_2 = w_{1V}^* w_{2V} + w_{1H}^* w_{2H} = 0,$ --, therefor.

In Column 10, Line 30, delete "$S_1(t)$" and insert -- $S_2(t)$ --, therefor.

Signed and Sealed this
Twelfth Day of August, 2014

Michelle K. Lee
*Deputy Director of the United States Patent and Trademark Office*